US008577222B2

(12) United States Patent
Han et al.

(10) Patent No.: US 8,577,222 B2
(45) Date of Patent: Nov. 5, 2013

(54) OPTICAL REPEATER SYSTEM

(75) Inventors: Kyung Eun Han, Seoul (KR); Yeong Shin Yeo, Gyeonggi-do (KR); Ki Chul Cho, Gyeonggi-do (KR)

(73) Assignee: Solid Technologies Inc., Gyeonggi-Do (KR)

( * ) Notice: Subject to any disclaimer, the term of this patent is extended or adjusted under 35 U.S.C. 154(b) by 0 days.

(21) Appl. No.: 13/378,695

(22) PCT Filed: Dec. 23, 2009

(86) PCT No.: PCT/KR2009/007730
§ 371 (c)(1),
(2), (4) Date: Mar. 1, 2012

(87) PCT Pub. No.: WO2010/147279
PCT Pub. Date: Dec. 23, 2010

(65) Prior Publication Data
US 2012/0155884 A1   Jun. 21, 2012

(30) Foreign Application Priority Data
Jun. 16, 2009   (KR) .................. 10-2009-0053319

(51) Int. Cl.
*H04B 10/00*   (2013.01)
(52) U.S. Cl.
USPC ............... 398/116; 398/115; 398/58; 398/66; 398/97; 398/173
(58) Field of Classification Search
USPC ......... 398/58–79, 97, 115–117; 379/56, 56.1; 335/296; 455/422.1–562.1; 359/145; 370/328
See application file for complete search history.

(56) References Cited

U.S. PATENT DOCUMENTS

| 5,852,651 A * | 12/1998 | Fischer et al. ............... 379/56.2 |
| 6,308,085 B1 * | 10/2001 | Shoki .......................... 455/562.1 |
| 6,353,600 B1 * | 3/2002 | Schwartz et al. ............. 370/328 |
| 2002/0003645 A1 * | 1/2002 | Kim et al. ..................... 359/145 |
| 2004/0203704 A1 * | 10/2004 | Ommodt et al. ........... 455/422.1 |

(Continued)

FOREIGN PATENT DOCUMENTS

| JP | 09-145672 | 6/1997 |
| KR | 10-2001-0044648 | 6/2001 |

(Continued)

OTHER PUBLICATIONS

ISR for related PCT/KR2009/007730 dated Jul. 15, 2010 with its English translation.

(Continued)

*Primary Examiner* — Li Liu
(74) *Attorney, Agent, or Firm* — Ladas & Parry, LLP

(57) ABSTRACT

The present invention relates to an optical relay system for transmitting multi-band frequency signals with limited bands by using optical lines. According to the present invention, a plurality of band-limited signals are band-combined into one signal by using a combiner, and the signals are transmitted through multiple outputs by using a distributor, and thus a multi-stage filter is not necessary. In addition, the present invention is capable of effectively solving various problems such as damage to the original signals caused by the band combination of the multi-stage filter, and there is no need to precisely connect each of the band-limited signals to the determined ports of the combiner and the signals can be connected to random ports, thereby improving convenience of use.

2 Claims, 3 Drawing Sheets

(56) References Cited

U.S. PATENT DOCUMENTS

2005/0226625 A1* 10/2005 Wake et al. .................. 398/115
2008/0219670 A1* 9/2008 Kim et al. .................... 398/115
2008/0254799 A1* 10/2008 Yahagi ......................... 455/436
2010/0226304 A1* 9/2010 Shoji ............................ 370/315

FOREIGN PATENT DOCUMENTS

| KR | 2001-0044648 | * | 6/2001 |
| KR | 20-0390790 | | 7/2005 |
| KR | 20-0395778 | | 9/2005 |
| KR | 10-2005-0102770 | | 10/2005 |
| KR | 10-0727076 | | 6/2007 |
| WO | WO 2007/015552 | * | 2/2007 |

OTHER PUBLICATIONS

IPRP for related PCT/KR2009/007730 issued Jul. 5, 2011 with its English translation.

* cited by examiner

OPTICAL REPEATER SYSTEM

CROSS-REFERENCE TO RELATED APPLICATIONS

This application is the U.S. National Stage of International Patent Application No. PCT/KR2009/007730 filed on Dec. 23, 2009, which claims priority to Korean Patent Application No. 10-2009-0053319 filed on Jun. 16, 2009, the disclosures of which are hereby incorporated by reference in their entireties.

TECHNICAL FIELD

Embodiments of the present invention relates to an optical relay system, and more particularly to an optical relay system to transmit signals of multiple frequency bands using an optical line.

BACKGROUND ART

In general, with development of mobile communication, use patterns of and demands for a communication device of users have been diversified. Users wish to perform communication without time and space restriction. However, an output of a radio frequency signal from a base station is restricted and a base station is mounted in each area or region. A shadow area may exist due to the location of a base station or the topography of an area. In order to eliminate the shadow area, an optical replay capable of obtaining a predetermined effect at low cost has been provided. The optical relay is mounted in an area in which a radio frequency signal is not received or is weak, such as the inside of a building, the basement of a building, a subway, a tunnel or an apartment complex of a residential area.

An optical relay system is used to extend the coverage of a base station such that a service is provided to a shadow area which a signal of a base station is unlikely to reach due to special topography or geographic features between base stations configuring a wireless communication service network.

In an optical relay system, a donor unit and a remote unit are connected through an optical cable. The donor unit converts an RF signal received from a base station into an optical signal and transmits the optical signal to the remote unit. The remote unit restores the optical signal received from the donor unit into an RF signal and transmits the RF signal to a mobile terminal.

The donor unit of the optical relay system includes a frequency module to amplify or control a TX signal received from the base station in order to send the TX signal to an apparatus and amplify or control an RX signal received from the apparatus in order to send the RX signal to the base station, on a frequency-by-frequency basis. In addition, the donor unit receives a band-limited signal from each frequency module and combines signals of multiple bands into one signal by passing only a signal of a desired band and filtering out a signal of an undesired band.

In the related art, for band combination of the signals output from the frequency modules into one signal, a filter corresponding to each frequency band is necessary. As the number of signals, the bands of which will be combined, is increased, the number of filters is increased. The filter needs to be accurately connected to each frequency module according to the frequency band, but may not be erroneously connected to each frequency module, in which case an original signal may be damaged. If frequency bands to be combined partially overlap, the bands may not be combined only using the filter.

DISCLOSURE

Technical Problem

Therefore, it is an aspect of the present invention to provide an optical relay system able to efficiently combine a plurality of band-limited signals into one signal and transmit a plurality of output signals.

Technical Solution

In accordance with one aspect of the present invention, there is provided an optical relay system including a base station interface unit configured to output radio frequency (RF) signals of multiple bands received from a base station to at least one optical distribution unit and transmit the RF signals of the multiple bands received from the at least one optical distribution unit to the base station according to frequency bands, the optical distribution unit configured to convert the RF signals received from the base station interface unit into optical signals and transmit the optical signals to at least one optical unit or convert optical signals received from the at least one optical unit into RF signals and output the RF signals, and the optical unit configured to convert the optical signals received from the optical distribution unit into RF signals and output the RF signals to a mobile terminal or convert RF signals received from the mobile terminal into optical signals and output the optical signals, wherein the base station interface unit combines the received RF signals of the multiple bands into one signal, divides the combined signal into a plurality of signals and transmits the plurality of signals to at least one optical distribution unit or combines the RF signals of the multiple bands received from the at least one optical distribution unit into one signal, divides the combined signal into a plurality of signals, and transmits the plurality of signals to the base station.

The base station interface unit may include a plurality of main drive base station units (MDBUs) configured to filter and amplify the RF signals received from the base station according to frequency bands and a main combination/division unit (MCDU) configured to combine the RF signals of the multiple bands output from the plurality of MDBUs or the RF signals of the multiple bands received from the at least one optical distribution unit into one signal using a combiner and divides the combined signal into a plurality of signals using a divider.

The MCDU may include a first combiner configured to combine the RF signals of the multiple bands output from the plurality of MDBUs into one signal, a first divider configured to divide the output signal of the first combiner into a plurality of signals, a second combiner configured to combine the RF signals of the multiple bands received from the at least one optical distribution unit into one signal, and a second divider configured to divide the output signal of the second combiner into a plurality of signals.

The MCDU may include one modem for communication with the optical unit.

A transmission unit of the modem may be provided between the first combiner and the first divider and a reception unit of the modem may be provided between the second combiner and the second divider.

Advantageous Effects

According to the embodiments of the present invention, it is possible to efficiently combine a plurality of band-limited signals into one signal using a combiner instead of a plurality of filters and transmit a plurality of output signals using a divider.

According to the embodiments of the present invention, since the plurality of band-limited signals may be input to any input port, it is possible to improve user convenience.

According to the embodiments of the present invention, even when band-limited signals input to the combiner partially overlap, it is possible to efficiently perform band combination due to properties of the combiner. Thus, it is possible to perform band combination without damaging an original signal.

DESCRIPTION OF DRAWINGS

The above and other objects, features and other advantages of the present invention will be more clearly understood from the following detailed description taken in conjunction with the accompanying drawings, in which.

BEST MODE

Figure 1:
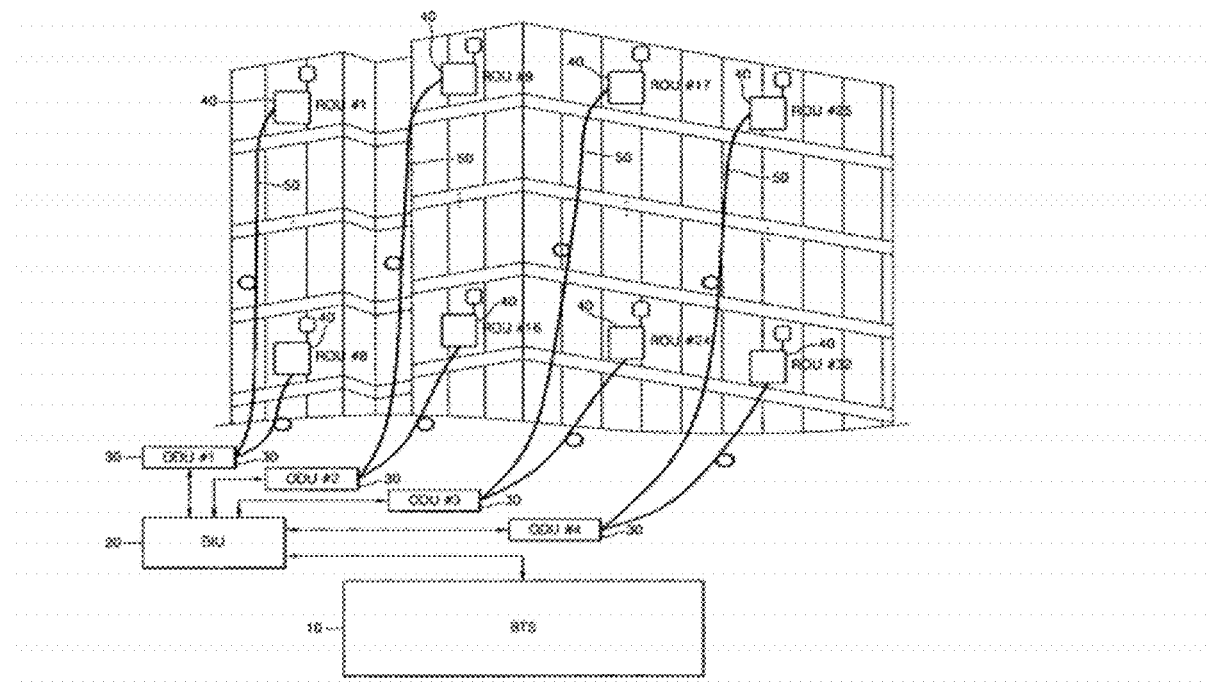
FIG. 1 is a diagram showing the configuration of an optical relay system according to an embodiment of the present invention.

In accordance with one aspect of the present invention, there is provided an optical relay system including a base station interface unit configured to output radio frequency (RF) signals of multiple bands received from a base station to at least one optical distribution unit and transmit the RF signals of the multiple bands received from the at least one optical distribution unit to the base station according to frequency bands, the optical distribution unit configured to convert the RF signals received from the base station interface unit into optical signals and transmit the optical signals to at least one optical unit or convert optical signals received from the at least one optical unit into RF signals and output the RF signals, and the optical unit configured to convert the optical signals received from the optical distribution unit into RF signals and output the RE signals to a mobile terminal or convert RF signals received from the mobile terminal into optical signals and output the optical signals, wherein the base station interface unit combines the received RF signals of the multiple bands into one signal, divides the combined signal into a plurality of signals and transmits the plurality of signals to at least one optical distribution unit or combines the RF signals of the multiple bands received from the at least one optical distribution unit into one signal, divides the combined signal into a plurality of signals, and transmits the plurality of signals to the base station.

The base station interface unit may include a plurality of main drive base station units (MDBUs) configured to filter and amplify the RF signals received from the base station according to frequency bands and a main combination/division unit (MCDU) configured to combine the RF signals of the multiple bands output from the plurality of MDBUs or the RF signals of the multiple bands received from the at least one optical distribution unit into one signal using a combiner and divides the combined signal into a plurality of signals using a divider.

The MCDU may include a first combiner configured to combine the RF signals of the multiple bands output from the plurality of MDBUs into one signal, a first divider configured to divide the output signal of the first combiner into a plurality of signals, a second combiner configured to combine the RF signals of the multiple bands received from the at least one optical distribution unit into one signal, and a second divider configured to divide the output signal of the second combiner into a plurality of signals.

The MCDU may include one modem for communication with the optical unit.

A transmission unit of the modem may be provided between the first combiner and the first divider and a reception unit of the modem may be provided between the second combiner and the second divider.

According to the embodiments of the present invention, it is possible to efficiently combine a plurality of band-limited signals into one signal using a combiner instead of a plurality of filters and transmit a plurality of output signals using a divider.

According to the embodiments of the present invention, since the plurality of band-limited signals may be input to any input port, it is possible to improve user convenience.

According to the embodiments of the present invention, even when band-limited signals input to the combiner partially overlap, it is possible to efficiently perform band combination due to properties of the combiner. Thus, it is possible to perform band combination without damaging an original signal.

Mode for Invention

Hereinafter, embodiments of the present invention will be described with reference to the accompanying drawings.

An optical relay system according to an embodiment of the present invention is a coverage system for an in-building service enabling high-quality mobile voice and data communication and seamless access. In addition, the optical relay system is a distributed antenna system to service an analog and digital telephone system within a plurality of bands using one antenna.

The optical relay system according to the embodiment of the present invention is mainly mounted in public institutions and private facilities such as a shopping mall, a hotel, a campus, an air port, a hospital, a subway, a sports complex or a convention center.

The optical relay system according to the embodiment of the present invention improves a poor propagation environment in a building, improves poor received signal strength indication (RSSI) and chip energy (Ec)/other interference (Io) which is total reception sensitivity of a mobile terminal, and services mobile communication even to a remote place of the building so as to enable a user to freely perform communication anywhere in the building. A plurality of mobile communication methods, such as representative analog mobile communication service (advanced mobile phone service (AMPS)), digital time division multiple access (TDMA), code division multiple access (CDMA), and asynchronous CDMA (wideband CDMA (WCDMA)), may be used in the building.

The optical relay system according to the embodiment of the present invention supports a mobile communication standard and public interface protocol. For example, as a frequency, a very high frequency (VHF), an ultra high frequency (UHF), 700 MHz, 800 MHz, 850 MHz, 900 MHz, 1900 MHz, 2100 MHz, etc. may be supported. As a voice protocol, AMPS, TDMA, CDMA, global system for mobile communication (GSM), integrated digital enhanced network (MEN), etc. may be supported. As a data protocol, enhanced data rates for GSM evolution (EDGE), general packet radio service (GPRS), WCDMA, CDMA 2000, paging, etc. may be supported.

The optical relay system according to the embodiment of the present invention is modularized according to frequency. In order to service a desired frequency in a building, a frequency module is inserted into each unit. The optical relay system is a unibody piece of equipment in which a new device is not mounted whenever a new frequency is added, by transmitting a plurality of signals through one optical cable.

FIG. 1 is a diagram showing the configuration of an optical relay system according to an embodiment of the present invention.

As shown in FIG. 1, the optical relay system according to the embodiment of the present invention includes a BTS interface unit (BIU) 20 to transmit or receive a radio frequency (RF) signal to or from a base station (BTS) 10 and a plurality of remote optical units (ROU) 40.

The BIU 20 is connected to each ROU 40 through an optical distribution unit (ODU) 30. The ODU 30 receives the RF signal from the BIU 20, converts the RF signal into an optical signal and transmits the optical signal, or converts an optical signal from each ROU 40 into an RF signal and outputs the RF signal to the BIU 20, as described below. The BIU 20 may include the ODUs 30.

The BIU 20 serves to supply a TX signal from the BTS 10 or a bidirectional amplifier (BDA) to four ODUs 30. In addition, the BIU 20 serves to divide RX signals from the ODUs 30 according to frequency bands.

Each ROU 40 is mounted in every building or on every floor of a building.

Figure 2:
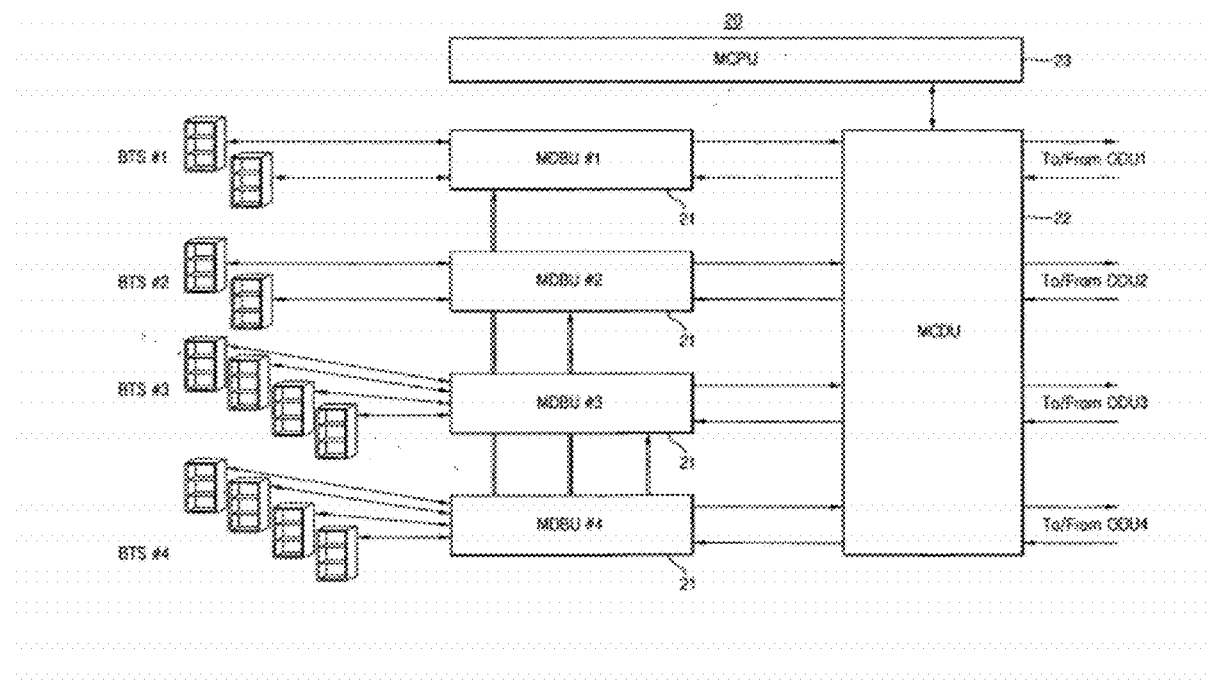
FIG. 2 is a block diagram showing a base station interface unit (BIU) of an optical relay system according to an embodiment of the present invention.

FIG. 2 is a schematic block diagram showing a BIU of an optical relay system according to an embodiment of the present invention.

As shown in FIG. 2, the BIU 20 includes main drive BTS units (MDBUs) 21 and a main combination/division unit (MCDU) 22. The BIU 20 further includes a main central processing unit (MCPU) 23.

The MDBUs 21 send TX signals of the BTSs (BTS #1 to BTS #4) 10 or BDAs to apparatuses or send RX signals of the apparatuses to the BTSs 10 or BDAs. The MDBUs 21 serve to monitor a TX input level and to automatically control input attenuation through an automatic gain control (AGC) function. Each MDBU 21 includes an attenuator (ATT) to control gain of the RX. The MDBUs 21 corresponding to frequency bands are mounted.

The MCDU 22 serves to combine the TX signals from the MDBUs 21 corresponding to the frequency bands and to send signals to the four ODUs 30. The MCDU 22 combines the RX signals received from a maximum of four ODUs 30 and sends signals to a maximum of four MDBUs 21. The MCDU 22 includes ports to interface with a VHF signal and a UHF signal, an input monitor and an input control ATT.

The MCPU 23 may check and control the states of the units mounted in the BIU 20. The MCPU 23 may check and control the states of a total of four ODUs 30 and check and control the states of the ROUs 40 through communication. In addition, an RS-232C port for serial communication is provided to check and control the states of the apparatuses through a computer. A communication LED indicator indicating the communication states with the ROUs 40 and an alarm LED indicator indicating whether or not the apparatuses are normal are provided on a front plate of the MCPU 23. The MCPU 23 includes an Ethernet port for connection to a high-level network and a port in which a GSM modem may be mounted.

Figure 3:
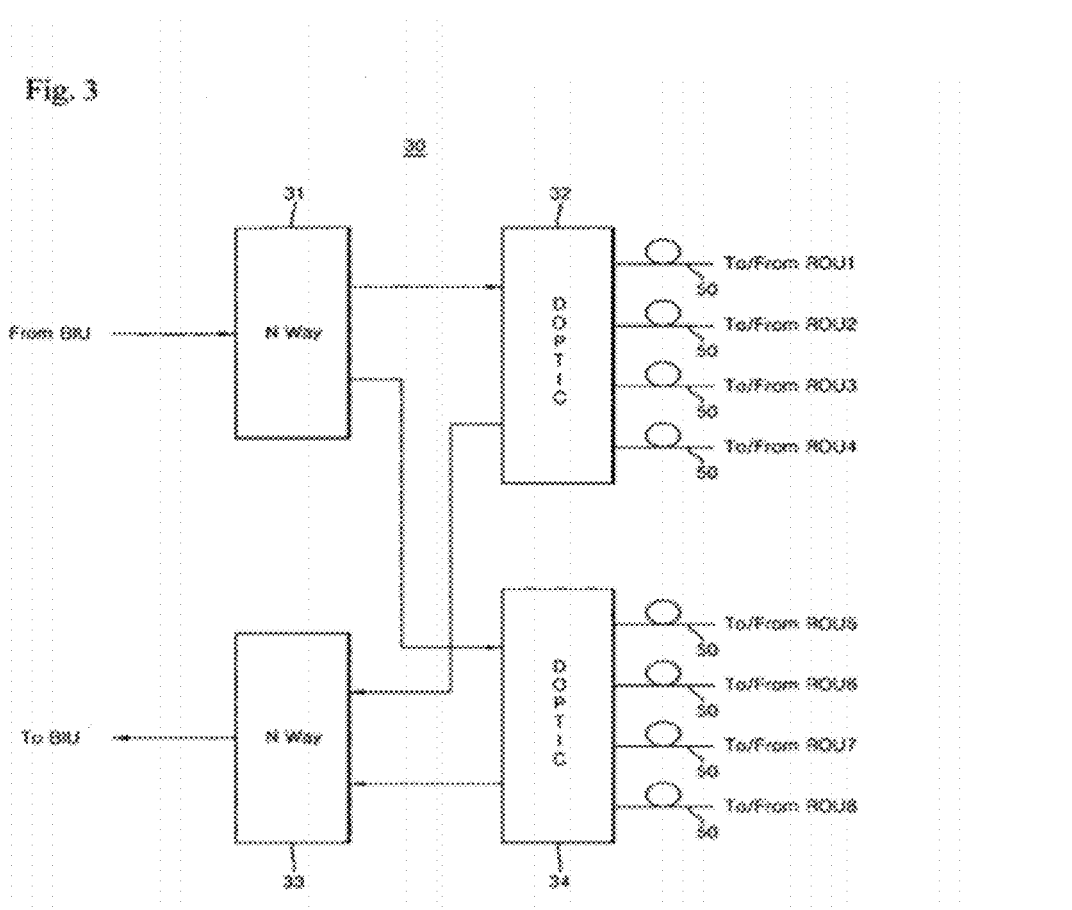
FIG. 3 is a block diagram showing an optical distribution unit (ODU) of an optical relay system according to an embodiment of the present invention.

FIG. 3 is a block diagram showing an ODU 30 of an optical relay system according to an embodiment of the present invention.

As shown in FIG. 3, the ODU 30 serves to receive the TX RF signal from the BIU 20 and to convert the RF signal into an optical signal. The optical signal is sent to the ROU 40 through an optical cable 50. The optical signal received from the ROU 40 is converted into the RF signal and the RF signal is sent to the BIU 20.

The ODU 30 includes a first divider (N-way divider) 31, a first donor optical unit (DOPTIC) 32, a first combiner (N-way combiner) 33 and a second donor optical unit (DOPTIC) 34.

A maximum of two DOPTICs 32 and 34 may be mounted per shelf of the ODU 30. The first DOPTIC 32 and the second DOPTIC 34 serve to convert the TX RF signals into the optical signals and to convert the RX optical signals to the RF signals. The DOPTICs 32 and 34 support, for example, four optical ports. Therefore, one ODU 30 may be connected to eight ROUs 40.

Each of the first DOPTIC 32 and the second DOPTIC 34 includes an optical splitter to split the optical signal emitted from a laser diode (LD) into four optical signals and distributing the four optical signals to optical ports. In addition, each of the first DOPTIC 32 and the second DOPTIC 34 includes a total of four photo diodes (PDs) to convert the optical signals received from the optical ports into electrical signals at the RX side. Each of the first DOPTIC 32 and the second DOPTIC 34 includes an optical compensation ATT to compensate for loss of the optical cable 50. Each of the first DOPTIC 32 and the second DOPTIC 34 includes a WDM unit such that only one optical cable 50 for communication with the ROU 40 is used. The maximum number of ODUs 30 which may be connected to the BIU 20 is four.

The first divider 31 serves to divide one TX RF signal into two signals. The first combiner 33 serves to combine two RX RF signals into one signal. The first divider 31 and the first combiner 33 are mounted in one module and are respectively used for TX/RX. The first divider 31 and the first combiner 33 are designed for broadband communication to respectively divide and combine various signals including a modem signal and a signal of 2 GHz or more.

Figure 4:
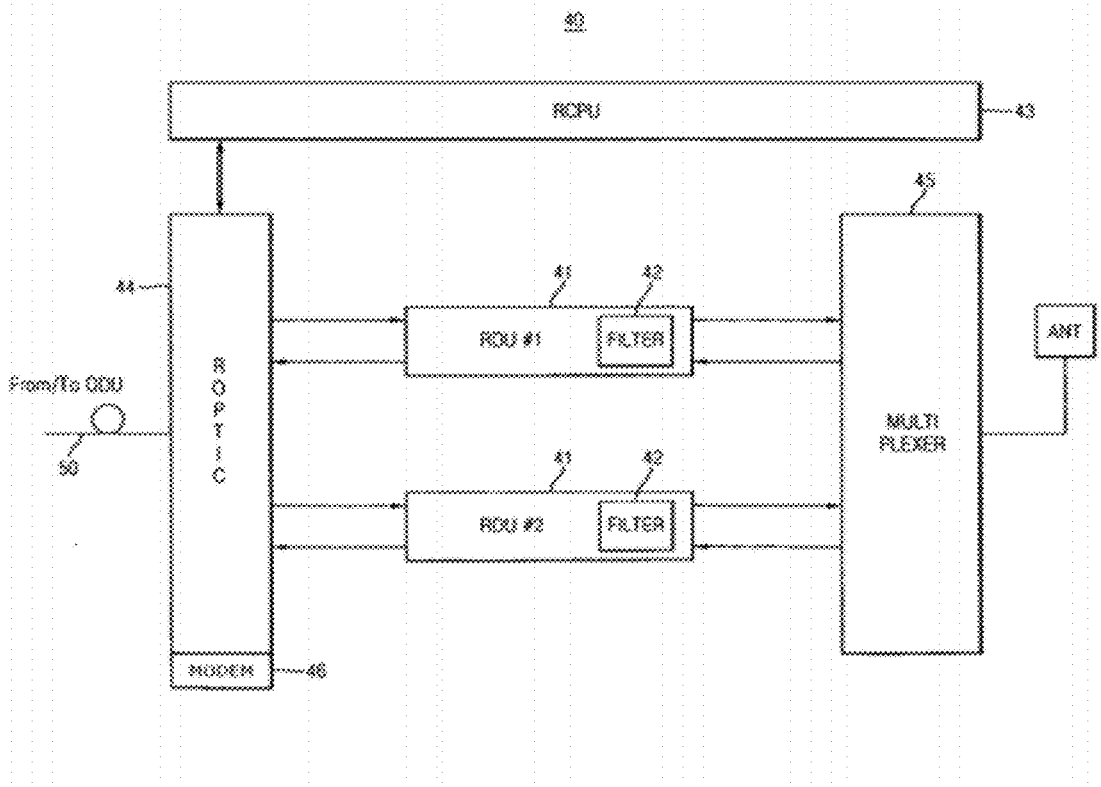
FIG. 4 is a block diagram showing a remote optical unit (ROU) of an optical relay system according to an embodiment of the present invention.

FIG. 4 is a block diagram showing an ROU 40 of an optical relay system according to an embodiment of the present invention.

As shown in FIG. 4, the ROU 40 includes a remote drive unit (RDU) 41 including a band pass filter (BPF) 42, a remote central processing unit (PCPU) 43, a remote OPTIC conversion unit (ROPTIC) 44 and a multiplexer 45.

The ROU 40 receives the TX optical signal from the ODU 30 and converts the TX optical signal into an RF signal. The converted RF signal is amplified by a high power amplifier in the RDU 41, is band-filtered by the BPF 42, and is emitted to an antenna ANT by the multiplexer 46.

The RX signal received through the antenna ANT is band-filtered in the RDU 41, is converted into an optical signal by the ROPTIC 44, and is sent to the ODU 30 which is a high-level unit. A maximum of three RDUs 41 may be mounted and designed for a maximum dual band utilization.

The RDU 41 serves to filter and amplify the TX signal and to filter amplify the RX signal. The BPF 42 connected to the RDU 41 serves to remove other signals. The RDU 41 serves to filter the TX signal of each band received from the ROPTIC 44 and to amplify the TX signal using a high power amplifier. The RDU 41 includes an ATT to control gain. RDUs respectively corresponding to frequency bands are included.

The ROPTIC 44 serves to convert the RX optical signal into the RF signal. The ROPTIC 44 serves to convert the RX RF signal into the optical signal. The ROPTIC 44 serves convert the optical signal into the RF signal and to convert the RF signal into the optical signal. The ROPTIC 44 includes a modem 46 to perform communication with a high-level unit. The ROPTIC 44 includes an optical ATT to compensate for optical loss.

The RCPU 43 controls the signal of each unit and monitors the BIU 20 and the ODU 30 through the modem 46. The RCPU 43 may monitor and control each unit of the ROU 40, receive and analyze communication data from the ROPTIC 44, and report the state value thereof to a high-level unit. An LED indicator is mounted on a front side of the RCPU so as to check the state of the system. A communication LED indicator is mounted on a front side of the RCPU to check the communication state with a high-level unit. The RCPU 43 may check and control the states of the apparatuses using a computer through the RS-232C serial port.

The multiplexer 45 serves to combine, for example, the TX signals of two RDUs 41. The multiplexer 45 serves to distribute RX signals to two RDUs 41. The multiplexer 45 transmits or receives signals of multiple frequency bands using one antenna ANT. The multiplexer 45 combines or distributes a plurality of signals to one antenna. The multiplexer includes ports to combine a plurality of signals and input/output ports of the RDUs 41 are connected to the ports.

Figure 5:
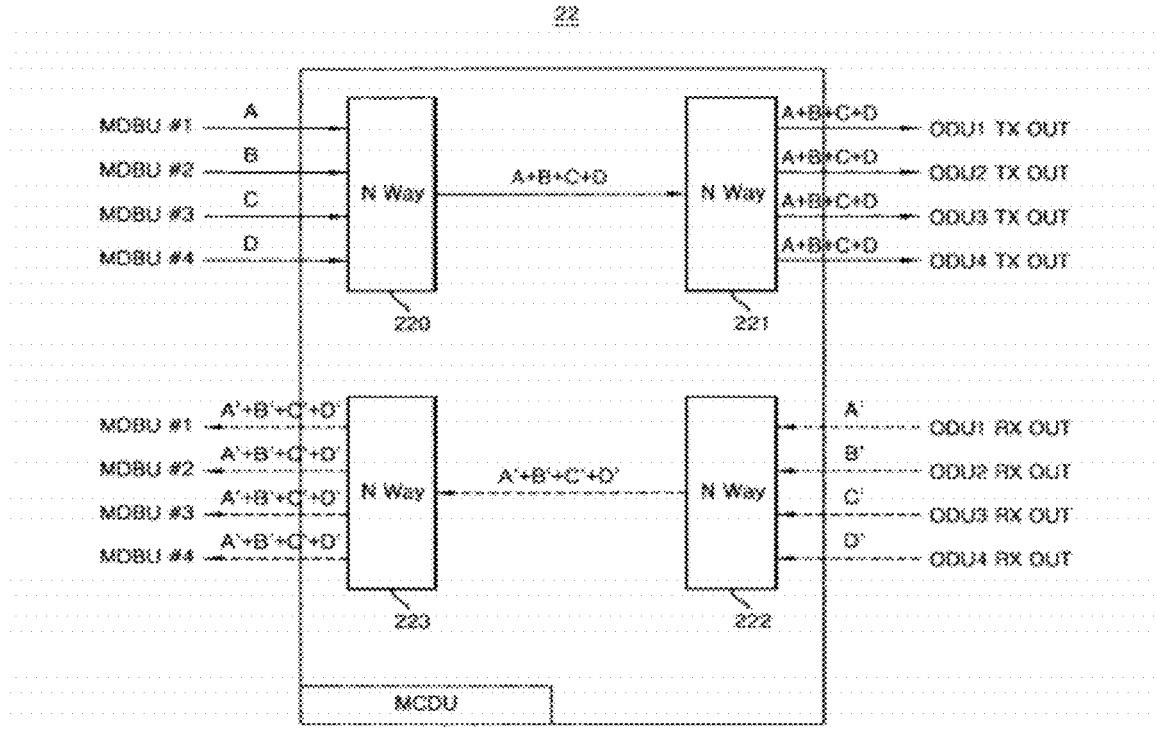
FIG. 5 is a schematic block diagram showing the configuration of a main combination/division unit (MCDU) of the BIU shown in FIG. 2.

FIG. 5 is a schematic block diagram showing the configuration of the MCDU 22 of the BIU 20 shown in FIG. 2.

As shown in FIG. 5, the MCDU 22 includes a first combiner (N-way combiner) 220 to combine four band-limited TX RF signals A, B, C and D received from the MDBUs 21 into one signal A+B+C+D and a first divider (N-way divider) 221 to divide the output signal A+B+C+D of the first combiner 220 into a plurality of identical signals. The output signals of the first divider 221 are respectively transmitted to the ODUs 30.

The MCDU 22 includes a second combiner (N-way combiner) 222 to combine four TX RF signals A', B', C' and D' received from the ODUs 30 into one signal A'+B'+C'+D' and a second divider (N-way divider) 223 t divide the output signal A'+B'+C'+D' of the second combiner 222 into a plurality of identical signals. The output signals of the second divider 223 are respectively transmitted to the MDBUs 21.

Accordingly, a plurality of band-limited signals is combined into one signal and a plurality of output signals is transmitted using a combiner and a divider, without using a filter. Since the plurality of band-limited signals may be connected to any input port of the combiner, it is possible to improve user convenience. Even when the band-limited signals input to the combiner partially overlap, it is possible to perform band combination of original signals without damage, due to the properties of the combiner.

In general, communication is performed between the BIU 20 and each ROU 40, for state check or control. Thus, in the related art, a modem is mounted in each ROU 40 and modems corresponding in number to the number of ODUs 30 are mounted in the BIU 20. For example, if the number of ODUs 30 is four, four modems are mounted in the BIU 20. As the number of ROUs 40 is increased, the number of ODUs 30 is increased. Thus, the number of modems mounted in the BIU 20 is increased and thus manufacturing costs are increased.

Accordingly, it is necessary to efficiently perform communication between the BIU 20 and each ROU 40 while decreasing the number of modems mounted in the BIU 20.

Figure 6:
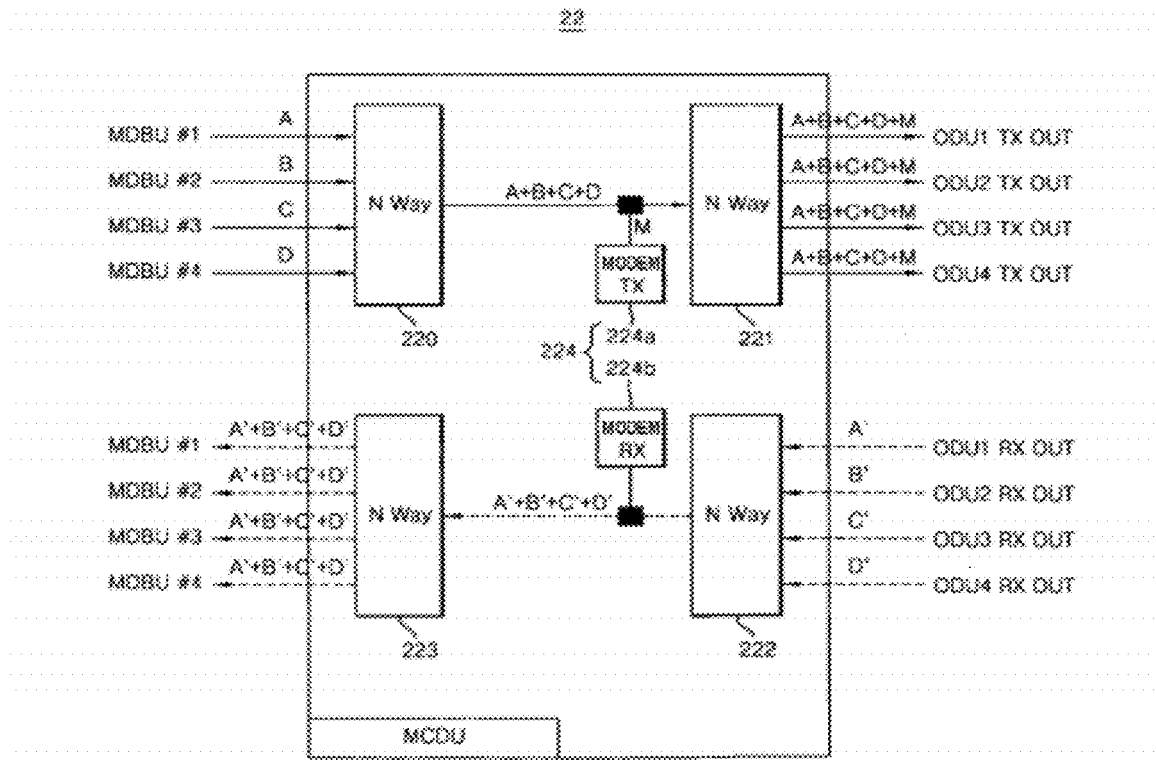
FIG. 6 is a schematic block diagram showing another MCDU of the BIU shown in FIG. 2.

FIG. 6 is a schematic block diagram showing another MCDU 22 of the BIU 20 shown in FIG. 2.

As shown in FIG. 6, the MCDU 22 includes a first combiner (N-way combiner) 220 to combine four band-limited TX RF signals A, B, C and D received from the MDBUs 21 into one signal A+B+C+D and a first divider (N-way divider) 221 to divide the output signal A+B+C+D of the first combiner 220 into a plurality of identical signals.

The MCDU 22 includes a second combiner (N-way combiner) 222 to combine four TX RF signals A', B', C' and D' received from the ODUs 30 into one signal A'+B'+C'+D' and a second divider (N-way divider) 223 to divide the output signal A'+B'+C'+D' of the second combiner 222 into a plurality of identical signals.

The MCDU 22 includes one modem 224 to perform communication with each ROU 40. A transmission unit (modem TX) 224a of the modem 224 is provided between the first combiner 220 and the first divider 221. A reception unit (modem RX) 224b of the modem 224 is provided between the second combiner 222 and the second divider 223. The MCPU 23 checks and controls the states of a total of four ODUs 30 using one modem 224 and checks and controls the state of the ROU 40 through communication. Accordingly, even when one modem 224 is included in the BIU 20, communication with each ROU 40 is possible. Accordingly, it is possible to remarkably reduce the number of modems, simplify a control operation, reduce manufacturing costs, and minimize a product size.

The MCDU 22 combines the four TX RF signals received from the MDBUs 21 corresponding to the frequency bands into one TX RF signal, divides the signal into four identical signals, and sends the four signals to the ODUs 30. A modem signal M is additionally included in the TX RF signal and the TX RF signal is sent to each ROU 40.

The MCDU 22 combines the RX RF signals received from the four ODUs 30 into one RX RF signal, divides the signal into four identical signals, and sends the four signals to the MDBU 21. A modem signal included in the RX RF signal is extracted and the RX RF signal is sent to the MCPU 23.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An optical relay system comprising:
a base station interface unit configured to output radio frequency (RF) signals of multiple bands received from a base station to at least one optical distribution unit and transmit the RF signals of the multiple bands received from the at least one optical distribution unit to the base station according to frequency bands;
the optical distribution unit configured to convert the RF signals received from the base station interface unit into optical signals and transmit the optical signals to at least one optical unit or convert optical signals received from the at least one optical unit into RF signals and output the RF signals; and
the optical unit configured to convert the optical signals received from the optical distribution unit into RF signals and output the RF signals to a mobile terminal or convert RF signals received from the mobile terminal into optical signals and output the optical signals, wherein the base station interface unit combines the received RF signals of the multiple bands into one signal, divides the combined signal into a plurality of signals and transmits the plurality of signals to at least one optical distribution unit and combines the RF signals of the multiple bands received from the at least one optical distribution unit into one signal, divides the combined signal into a plurality of signals, and transmits the plurality of signals to the base station, wherein the base station interface unit includes a plurality of main drive base station units (MDBUs) configured to filter and amplify the RF signals received from the base station according to frequency bands and a main combination/division unit (MCDU) configured to combine the RF signals of the multiple bands output from the plurality of MDBUs or the RF signals of the multiple bands received from the at least one optical distribution unit into one signal using a combiner and divide the combined signal into a plurality of signals using a divider, and wherein the MCDU includes one modem for communication with the optical unit, and wherein a transmission unit of the modem is provided between the first combiner and the first divider and a reception unit of the modem is provided between the second combiner and the second divider.

2. The optical relay system according to claim 1, wherein the MCDU includes a first combiner configured to combine the RF signals of the multiple bands output from the plurality of MDBUs into one signal, a first divider configured to divide the output signal of the first combiner into a plurality of signals, a second combiner configured to combine the RF signals of the multiple bands received from the at least one optical distribution unit into one signal, and a second divider configured to divide the output signal of the second combiner into a plurality of signals.

* * * * *